ID [19] United States Patent
Botros

[11] 4,089,078
[45] May 16, 1978

[54] ARYLAZOPYRAZOLONE DYES FOR POLYESTER

[75] Inventor: Raouf Botros, Beech Creek, Pa.

[73] Assignee: American Color & Chemical Corporation, Charlotte, N.C.

[21] Appl. No.: 692,931

[22] Filed: Jun. 4, 1976

[51] Int. Cl.² .................. C09B 29/38; D06P 1/04; D06P 1/18
[52] U.S. Cl. ..................... 8/41 C; 260/163; D06P/3/54
[58] Field of Search ............ 260/163; 8/41 C

[56] References Cited

U.S. PATENT DOCUMENTS

| | | | |
|---|---|---|---|
| 2,019,914 | 11/1935 | Kracker | 260/163 X |
| 2,228,303 | 1/1941 | Fischer | 260/163 X |
| 3,019,217 | 1/1962 | Joyce | 260/163 |
| 3,096,321 | 7/1963 | Ribka | 260/193 |
| 3,152,114 | 10/1964 | Siegel et al. | 260/157 |
| 3,198,783 | 8/1965 | Lewis | 260/163 |
| 3,212,841 | 10/1965 | Stanley | 260/162 X |
| 3,325,469 | 6/1967 | Berrie et al. | 260/162 |

Primary Examiner—Floyd D. Higel
Attorney, Agent, or Firm—Armstrong, Nikaido, Marmelstein & Kubovcik

[57] ABSTRACT

Bright greenish yellow dyes of excellent color value prepared by coupling a lower alkyl anthranilate into 1-phenyl-3-carbalkoxy-5-pyrazolone and having the formula:

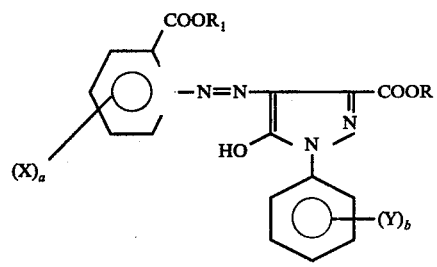

where R and $R_1$ are independently lower alkyl; X is hydrogen, halogen, nitro, hydroxy, lower alkyl or lower alkoxy; Y is hydrogen, halogen, lower alkyl or nitro and $a$ and $b$ are integers of 1–2. This class of azo dyes, when appropriately dispersed, produces dyeings on aromatic polyester fabrics with excellent substantivity, outstanding sublimation fastness and good fastness to light. The dyes are applied to polyester, such as polyethyleneterephthalate, by carrier dyeing, pressure dyeing and thermofixation methods.

5 Claims, No Drawings

ARYLAZOPYRAZOLONE DYES FOR POLYESTER

BACKGROUND OF THE INVENTION

Among the polyester fibers, those based on polyethlene terephthalate continue to be the most important, although fibers based on 1,4-dimethylenecyclohexane terephthalate have become commercially available. Developments in both homo- and co-polyesters have continued and many modified versions of polyethylene terephthalate have recently appeared on the market. With the advent of new fibers, the search is continued for dyes which build up on the various types of polyester fabric proportionate to the amount of dye applied, and which are characterized by good light and excellent sublimation properties.

Monoazo dyes in which the coupler portion is a 1-aryl-5-pyrazolone have not found wide acceptance as disperse dyes for the coloring of polyester fabric. Previously known dyes of this class do not provide intense enough dyeings to satisfy the needs of the textile trade and the weak dyeings obtained are usually not fast to the action of light or dry heat. Attempts to improve these deficiencies have usually resulted in even lower affinities. The shades, if they could be built up into adequate strength, are of interest because attractive greenish yellow hues can be obtained. Furthermore, such yellows are usually not photochromic as contrasted with the redder yellows which result fom phenolic or aryl amino couplers.

The use of pyrazolone azo dyes on polyester has been previously suggested. Joyce, U.S. Pat. No. 3,019,217, discloses a dye prepared by coupling ortho-chloroaniline into 1-phenyl-3-carbethoxy-5-pyrazolone. Although Joyce reported that his dye provided excellent color value, good crock resistance and excellent light fastness on polyester fibers, Stanley in U.S. Pat. No. 3,212,841 reported that the dye of Joyce is not suited for application by thermofixation methods because of sublimation or volatilization during processing. In Column 5 of the Stanly patent it was noted that the dye of Joyce had poor sublimation fastness and was not suitable for high temperature usage. Stanly reported that his dyes, made with a diazotized alpha -aminoanthraquinone base, showed, when dyed on polyester, an unexpected fastness to sublimation. Stanly, however, recommended application by thermofixation and noted that when carrier dyeings were made at or near boiling for 45 minutes, the dyeings were not as strong or bright as those obtained by the thermofixation method.

According to the present invention, a class of new arylazopyrazolone dyes are provided which have greatly improved affinity over known pyrazolone structures for polyester fibers. The new dyes color polyester fibers in strong, bright greenishyellow hues, a shade of yellow difficult to obtain, especially when it is accompanied by good dyeability and excellent fastness properties. The dyes according to the invention are superior to the azopyrazolones suggested by the prior art for polyester fiber because by using the new dyes useful dyeings of excellent fastness properties, brightness, color value and buildup can be obtained regardless of whether the dyeing is done by carrier, pressure or thermofixation methods. Furthermore, the dyes of the invention are not photochromic.

SUMMARY OF THE INVENTION

In accordance with the invention there is provided a dye of the formula:

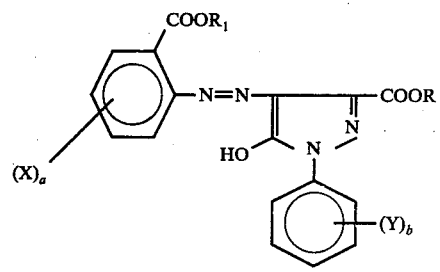

in which R and $R_1$ are independently lower alkyl radicals, X is a member selected from the group consisting of hydrogen, halogen, nitro, hydroxy, lower alkyl and lower alkoxy, Y is hydrogen, halogen, lower alkyl or nitro and $a$ and $b$ are integers ranging from 1–2. The term "lower" as applied to alkyl and alkoxy refers to chains of up to 6 carbon atoms.

The new dyes are applied by carrier dyeing, pressure dyeing and thermofixation, using standard methods to provide polyester fabric dyed in a bright greenish yellow, characterized by good color value and excellent properties.

DETAILED DESCRIPTION OF THE INVENTION

The dyes of the above formula are made in the conventional manner by adding a diazotized lower alkyl anthranilate to a solution of an appropriate coupling component. Typical lower alkyl anthranilates useful as the diazotizable base in the coupling reaction are methyl anthranilate; ethyl anthranilate; methyl-5-nitroanthranilate; ethyl-4-chloroanthranilate; methyl-5-chloro-4-nitroanthranilate; methyl-4-hydroxyanthranilate; ethyl-3,4-dimethoxyanthranilate; ethyl-4-methylanthranilate and methyl-3,5-dibromoanthranilate.

The aminobenzene intermediate is diazotized in a conventional way by treating it with an aqueous solution of a strong mineral acid such as hydrochloric acid, cooling the resulting solution to a temperature of 0°–10° C and adding thereto a quantity of sodium nitrite slightly in excess of the stoichiometric requirement. An alternate method of diazotization involves dissolving sodium nitrite in concentrated sulfuric acid, heating to a temperature of about 60°–70° C., cooling the resulting solution to 0°–10° C and adding thereto the aminobenzene.

Couplers useful in preparing the dyes are the 1-phenyl-3-carboalkoxy-5-pyrazolones, including, for example, 1-phenyl-3-carbethoxy-5-pyrazolone; 1-(4-chlorophenyl)-3 -carbethoxy-5-pyrazolong; 1-phenyl-3-carbmethoxy-5-pyrazolone; 1-(2,5-dichlorophenyl)-3-carbethoxy-5-pyrazolone; 1-(4-nitrophenyl)-3-carbethoxy-5-pyrazolone and 1-(4-tolyl)-3 -carbmethoxy-5-pyrazolone.

The azo dyestuffs used in the invention are made by the reaction of the diazotized aminobenzene with the coupler by adding the diazonium salt to a cold aqueous alkaline solution of the coupler. The mixture is allowed to react until the coupling is essentially complete, usually in 1–24 hours at 0° C to room temperature and is thereafter filtered and washed alkali free. The desired azo product is thus obtained in the form of a moist cake.

To prepare the product for application to the polyester substrates noted hereinabove, it must be suitably dispersed. This may be done by any of the several well-known methods: milling as in a ball-mill with dispersing agents such as lignin sulfonic acid materials, for instance. The resultant aqueous dispersion can be dried, as in a spray dryer, or preserved and used as a paste. Standardization to any desired lower strength can be done with inert colorless diluents such as soluble inorganic salts, soluble organic materials or additional dispersant for powders, or water for pastes. Other materials such as preservatives, foam-control agents, and wetting agents may be added as desired.

Disperse pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates, e.g., the condensation products of sulfonated naphthalene and ormaldehyde, such as sodium dinaphthylmethane disulfonate, are conveniently used. The oil disperse paste may be cut or standardized to a standard strength with water. The final color content of the finished paste is usually set to be from 10 to 40% of the monoazo compound.

Disperse powders are prepared by wet milling color in the presence of a dispersant, such as those mentioned hereabove, in equipment such as a ball mill, Werner-Pfleiderer mill or attritor. The dispersed material is oven or spray dried and micropulverized if necessary to provide the dispersed powder. The color is cut or standardized to a standard strength in a blender with a diluent, such as sodium sulfate or dextrin. A wetting agent, such as sodium cetyl sulfate or an alkylaryl polyether alcohol may be added to aid in wetting out the product when it is placed in the dye bath. Disperse powders are usually cut or standardized to 25-60 percent by weight color content (pure color).

The dye, when added to water with or without auxiliary agents, forms a near colloidal aqueous dispersion from which the aromatic polyester fiber or textile material is dyed in the conventional manner at 40°-100° C (104°-212° F) to give a colored fiber containing about 0.01-2 percent by weight dye (100% color basis).

Alternatively, dyeing may be accomplished without a carrier at temperatures of 100°-150° C under pressure. Also, the dye may be applied in patterns by conventional printing methods, if desired.

The dye can also be applied to the aromatic polyester fiber by thermofixation methods such as the "Thermosol" process. This process, which involves padding the cloth with the diluted dye dispersion followed by drying and heating with dried hot air or heated contact rolls, is conveniently used for dyeing polyester fibers and blends containing these fibers. Fixation temperatures of 180°-220° C (356°-428° F) are used for 30 to 90 seconds. If the fabric contains cotton or viscose rayon, apart from synthetic fibers, there is little danger of damaging cellulosic portions, but if wool is present, the temperature must be kept within 180°-200° C and the time must be reduced to 30 seconds.

In order to evaluate the effectiveness of a particular dye for a given type of fiber, the dyed fiber is examined for substantivity of the color, light fastness of the color, and resistance of the color to sublimation. Specific tests for the evaluation of these important properties are described in the examples that follow.

My invention is further illustrated by the following examples.

EXAMPLE I

A dye of the formula

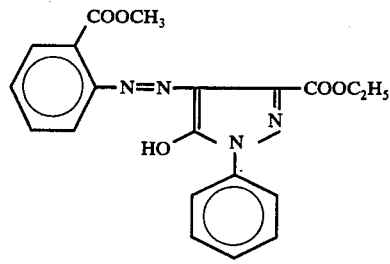

was prepared as follow:

(a) Diazonium Solution

Into a beaker was placed 200 ml. of water, 40 g. of 32% hydrochloric acid and 15.1 g. of methylanthranilate (0.1 mole). The mixture was stirred at room temperature to complete solution, then it was iced to 0° C. The clear solution was diazotized by adding in a thin stream of 0° C a solution of 7.2 g. of sodium nitrite (0.1 mole) dissolved in 100 ml. of water. The diazo solution was stirred at 0° C for ½ hour. Excess nitrous acid was destroyed with a few drops of sulfamic acid. The clear diazo solution was held at 0° C.

(b) Coupling

There was charged to a 4 liter beaker 500 ml. of water, 8 g. sodium hydroxide (0.2 mole), 35 g. sodium acetate (0.43 mole), and 23.2 g. 1-phenyl-3-carbethoxy-5-pyrazolone (0.1 mole). The mixture was stirred to complete solution. Ice was then added to bring the temperature to 0° C. There was added during a period of ½ hour the diazo solution prepared as described above. The mixture was filtered and the cake was washed neutral with 10% aqueous sodium chloride solution. The cake was reslurried in water and made acidic to Congo Red paper with a few drops of hydrochloric acid. The mixture was stirred for two hours and was then filtered and washed acid free with water. Yield: 235.2 g. wet cake; 16% dry test = 37.6 g. 100% dry, representing 95% of theory.

(c) Dispersion 230 g. of the wet cake prepared as described above was charged to a sandmill along with 55 g. of lignin sulfonic acid (Lignosol FTA and Lignosol D-10, commercially available dispersing agents), 83 ml. water and 83 ml. sand. The mixture was milled until the dispersion test was satisfactory. The resulting disperse paste, 368 g., had a 10% color content.

EXAMPLE II

An aqueous dye bath containing 10% Marcron L (a commercially available phenolic dye carrier) and 1% monosodium phosphate as a buffering agent was prepared. Type 54 "Dacron" polyester fabric was treated in a bath at 120° F for 10 minutes, the fabric-to-water dye bath ratio being 1:40. The disperse dye made as described in Example I was added in an amount sufficient to provide a bath containing 0.4% dye based on the weight of polyester fibers. Dyeing was continued for one hour at 205° F and the fabric was removed from the bath, rinsed and dried. Sample dyeings were tested for sublimation according to standard AATCC Fastness to Dry Heat (sublimation) Test No. 117-1974T, p.119 of the 1974 Technical Manual of the American Association of Textile Chemists and Colorists. Dyed fabric was placed between a sandwich of undyed "Dacron" polyester fabric and heat was applied for 30 seconds. Sublimation tests were made at 350° F and 400° F on goods as described above. The dyeing was characterized by a bright greenish yellow hue. Sublimation tests showed very little transfer of color even at 400° F.

Similar excellent results were obtained when the dye was applied to the fabric by thermofixation methods and then tested for sublimation as described above.

applied to polyester fiber by conventional dyeing procedures.

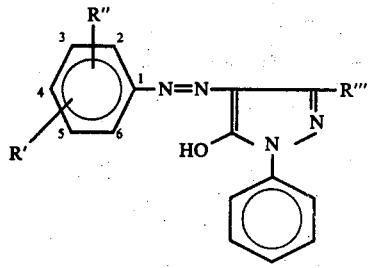

| | Structure of Dye | | | Dyeing Characteristics on Polyester | | | |
|---|---|---|---|---|---|---|---|
| Ex. | R' | R" | R'" | Shade or Hue | Lightfastness | Sublimation | Photochromism |
| I | 4-NO$_2$ | H | CH$_3$ | yellow | excellent | poor | no |
| II | 4-NO$_2$ | 2-Cl | CH$_3$ | weak and dull yellow | excellent | fair | no |
| III | 4-NO$_2$ | H | COOC$_2$H$_5$ | reddish yellow | excellent | fair | slightly |
| IV | 5-Cl | 2-Cl | COOC$_2$H$_5$ | poor color value when dyed by Thermofix | poor when dyed by Thermofix | fair | no |
| V | 4-COOC$_2$H$_5$ | H | CH$_3$ | yellow | poor when dyed by Thermofix | poor | no |
| VI | 2-COOC$_2$H$_5$ | H | CH$_3$ | reddish yellow | excellent | poor | no |
| VII | 4-COOC$_2$H$_5$ | H | COOC$_2$H$_5$ | dull reddish yellow | excellent | excellent | yes |

The dyeings were also tested for light fastness by subjecting them to carbon arc fading in accordance with AATCC Color Fastness to Light Carbon Arc Lamp, Continuous Light Test No. 16A-1974, as detailed on p.124, of the 1974 Technical Manual of the AATCC. The dyeings showed no break at 20 hours exposure, indicating excellent fastness to light.

EXAMPLES III - XIV

The following table lists dyes which can be made according to the procedure of Example I with the substitution of an appropriate base or coupler defined by the general formula given above. The table shows the base, the coupler and the shade on polyester.

TABLE I

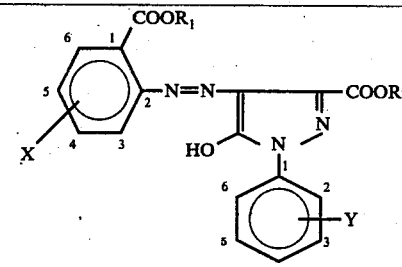

| Ex. | X | R$_1$ | R | Y | Shade |
|---|---|---|---|---|---|
| III | H | C$_2$H$_5$ | CH$_3$ | H | Greenish Yellow |
| IV | 5-NO$_2$ | CH$_3$ | C$_2$H$_5$ | H | Reddish Yellow |
| V | 3,5-diBr | CH$_3$ | C$_2$H$_5$ | H | Yellow |
| VI | H | CH$_3$ | C$_2$H$_5$ | 2,5-diCl | Greenish Yellow |
| VII | H | CH$_3$ | C$_2$H$_5$ | 4-NO$_2$ | Greenish Yellow |
| VIII | 5-CH$_3$, 3-NO$_2$ | CH$_3$ | C$_2$H$_5$ | H | Yellow |
| XI | 4-OH | CH$_3$ | CH$_3$ | H | Yellow |
| X | 5-OCH$_3$ | CH$_3$ | C$_2$H$_5$ | H | Yellow |
| XI | 5-Cl, 3-NO$_2$ | CH$_3$ | C$_2$H$_5$ | H | Yellow |
| XII | 4-OH | CH$_3$ | C$_2$H$_5$ | H | Greenish Yellow |
| XIII | H | CH$_3$ | C$_2$H$_5$ | 4-CH$_3$ | Greenish Yellow |
| XIV | H | CH$_3$ | C$_2$H$_5$ | 4-Cl | Greenish Yellow |

COMPARATIVE EXAMPLES I - VII

The preparative method of Example I was used to make dyes of the following formula, which were then

What is claimed is:
1. A dye of the formula:

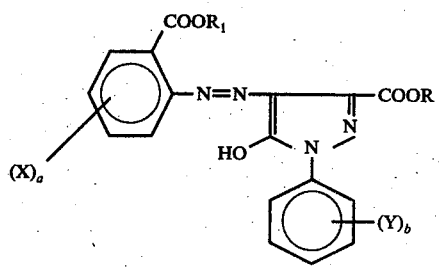

in which R and R$_1$ are independently lower alkyl, X is a member selected from the group consisting of hydrogen, halogen, nitro, hydroxy, lower alkyl and lower alkoxy, Y is hydrogen, halogen, lower alkyl or nitro, and $a$ and $b$ are integers ranging from 1 - 2.

2. A dye of claim 1 of the formula:

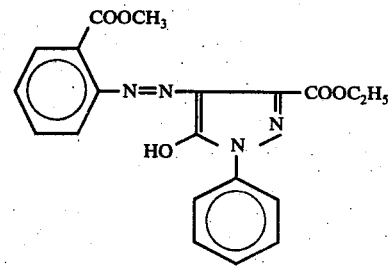

3. A dye of claim 1 of the formula:

4. A dye of claim 1 of the formula:
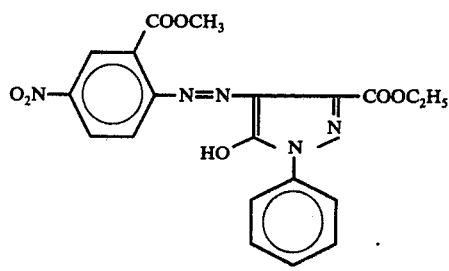
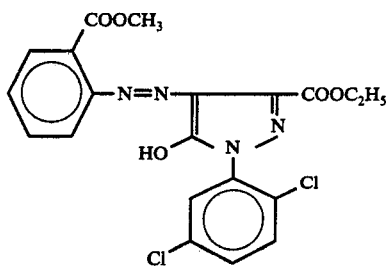
5. Polyester textile material dyed with 0.01 to 2% by weight of the dye of claim 1.
* * * * *